United States Patent
Rowan et al.

(10) Patent No.: US 10,866,340 B2
(45) Date of Patent: Dec. 15, 2020

(54) INTEGRATED OILFIELD ASSET MODELING USING MULTIPLE RESOLUTIONS OF RESERVOIR DETAIL

(71) Applicant: Schlumberger Technology Corporation, Sugar Land, TX (US)

(72) Inventors: David Rowan, Abingdon (GB); Mark Wakefield, Abingdon (GB); Simon D. Bulman, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 622 days.

(21) Appl. No.: 14/915,674

(22) PCT Filed: Sep. 5, 2014

(86) PCT No.: PCT/US2014/054177
§ 371 (c)(1),
(2) Date: Mar. 1, 2016

(87) PCT Pub. No.: WO2015/035105
PCT Pub. Date: Mar. 12, 2015

(65) Prior Publication Data
US 2016/0222766 A1 Aug. 4, 2016

Related U.S. Application Data

(60) Provisional application No. 61/873,998, filed on Sep. 5, 2013.

(51) Int. Cl.
*G01V 99/00* (2009.01)
*G01V 11/00* (2006.01)
(Continued)

(52) U.S. Cl.
CPC ............ *G01V 99/005* (2013.01); *E21B 41/00* (2013.01); *E21B 43/00* (2013.01); *E21B 44/00* (2013.01);
(Continued)

(58) Field of Classification Search
CPC .. G06F 17/5009; G01V 99/005; G01V 11/00; G01V 2210/66; E21B 43/00; E21B 49/00;
(Continued)

(56) References Cited

U.S. PATENT DOCUMENTS 6,928,399 B1 * 8/2005 Watts, III ............... E21B 49/00
702/13
7,904,248 B2 * 3/2011 Li .......................... G01V 1/282
702/12
(Continued)

FOREIGN PATENT DOCUMENTS

WO 2010056415 A1 5/2010

OTHER PUBLICATIONS

Lagoni, Per, and Jon Barley. "On Simulation Accuracy." PSIG Annual Meeting. Pipeline Simulation Interest Group, 2007. pp. 23. (Year: 2007).*
(Continued)

*Primary Examiner* — Kamini S Shah
*Assistant Examiner* — John E Johansen

(57) ABSTRACT

A method, apparatus, and program product model an oilfield asset by selecting, for each of multiple sectors of the oilfield asset, a sector model from among a collection of sector models, building a multi-resolution integrated asset model of the oilfield asset using the selected sector model for each of the sectors, and performing a computer simulation using the multi-resolution integrated asset model. The collection of sector models for each sector includes multiple sector models modeled at varying resolutions. In addition, the
(Continued)

multi-resolution integrated asset model includes a surface network model that couples the selected sector models to one another. As such, different sectors of an oilfield asset may be modeled at varying resolutions to balance accuracy and turnaround time when performing integrated oilfield asset modeling.

20 Claims, 9 Drawing Sheets

(51) Int. Cl.
　　　*E21B 43/00*　　　(2006.01)
　　　*E21B 41/00*　　　(2006.01)
　　　*E21B 44/00*　　　(2006.01)
　　　*E21B 49/00*　　　(2006.01)
(52) U.S. Cl.
　　　CPC .............. *E21B 49/00* (2013.01); *G01V 11/00* (2013.01); *E21B 2200/20* (2020.05); *E21B 2200/22* (2020.05); *G01V 2210/66* (2013.01)
(58) Field of Classification Search
　　　CPC ...... E21B 41/00; E21B 44/00; E21B 2200/20; E21B 2200/22
　　　USPC .......................................................... 703/10
　　　See application file for complete search history.

(56) References Cited

U.S. PATENT DOCUMENTS

| | | | | |
|---|---|---|---|---|
| 8,463,586 | B2* | 6/2013 | Mezghani | G01V 99/00 |
| | | | | 703/10 |
| 8,725,481 | B2* | 5/2014 | Usadi | E21B 43/00 |
| | | | | 703/10 |
| 9,134,454 | B2* | 9/2015 | Mishev | E21B 43/00 |
| 2007/0027666 | A1 | 2/2007 | Frankel | |
| 2009/0150127 | A1 | 6/2009 | Ghorayeb et al. | |
| 2010/0057418 | A1 | 3/2010 | Li et al. | |
| 2012/0204142 | A1* | 8/2012 | Rubenstein | G06F 8/30 |
| | | | | 717/101 |
| 2013/0132049 | A1* | 5/2013 | Dogru | G06F 17/10 |
| | | | | 703/2 |
| 2016/0003008 | A1* | 1/2016 | Uribe | E21B 43/00 |
| | | | | 175/50 |

OTHER PUBLICATIONS

PCT/US2014/054177, International Search Report & Written Opinion, dated Dec. 2, 2014, 12 pgs.

\* cited by examiner

INTEGRATED OILFIELD ASSET MODELING USING MULTIPLE RESOLUTIONS OF RESERVOIR DETAIL

CROSS-REFERENCE TO RELATED APPLICATIONS

This application claims the benefit of U.S. Provisional Application No. 61/873,998, filed on Sep. 5, 2013, the disclosure of which is incorporated by reference in its entirety.

BACKGROUND

An oilfield asset may be viewed as a single or multiple subsurface reservoir system (hydrocarbon-bearing rock) into which wells are drilled and that produces hydrocarbon fluids through a gathering system of pipelines and surface equipment. The subsurface plus surface system may be modeled together using reservoir and pipeline simulators to predict asset performance and enable field development planning decisions to be made. Such decisions are generally influenced by the ability of the subsurface system to deliver fluids into the surface pipeline network and the capacity of the surface facility to handle both the hydrocarbon fluids as well as other reservoir fluids. The viability of an asset generally relies on a delicate balance between the reservoir and surface facilities and hence being able to model the coupled system is generally of importance to an engineer.

The subsurface component of an oilfield simulation model may be divided into sub-volumes of particular interest, also known as sector models. The sub-volumes may for example be distributed areally, e.g., according to the distribution of wells and the overlying surface gathering system of platforms, or may be related to production from isolated reservoir regions (also referred to as "independently producing reservoirs"). Such a sub-division generally enables individual engineers to work independently on parts of an overall asset to improve the productivity of the team and the ability to manage large and complex fields.

In large and complex fields, however, modeling of integrated subsurface and surface systems may be extraordinarily computationally expensive and time consuming, particularly when modeling is performed at a high resolution, e.g., where the subsurface is represented by millions, tens of millions, etc. individual three-dimensional cells. While modeling may be performed at lower resolutions by increasing the size of each cell and thereby decreasing the overall number of cells representing the subsurface, decreasing the resolution comes at a cost of less precision and accuracy, and consequently models that are not quite as effective at predicting asset performance. As such, a tradeoff regularly exists between accuracy and turnaround time when selecting a resolution to be used when performing integrated oilfield asset modeling.

SUMMARY

The embodiments disclosed herein provide a method, apparatus, and program product that model an oilfield asset by selecting, for each of multiple sectors of the oilfield asset, a sector model from among a collection of sector models, building a multi-resolution integrated asset model of the oilfield asset using the selected sector model for each of the sectors, and performing a computer simulation using the multi-resolution integrated asset model. The collection of sector models for each sector includes multiple sector models modeled at varying resolutions. In addition, the multi-resolution integrated asset model includes a surface network model that couples the selected sector models to one another. As such, different sectors of an oilfield asset may be modeled at varying resolutions to balance accuracy and turnaround time when performing integrated oilfield asset modeling.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
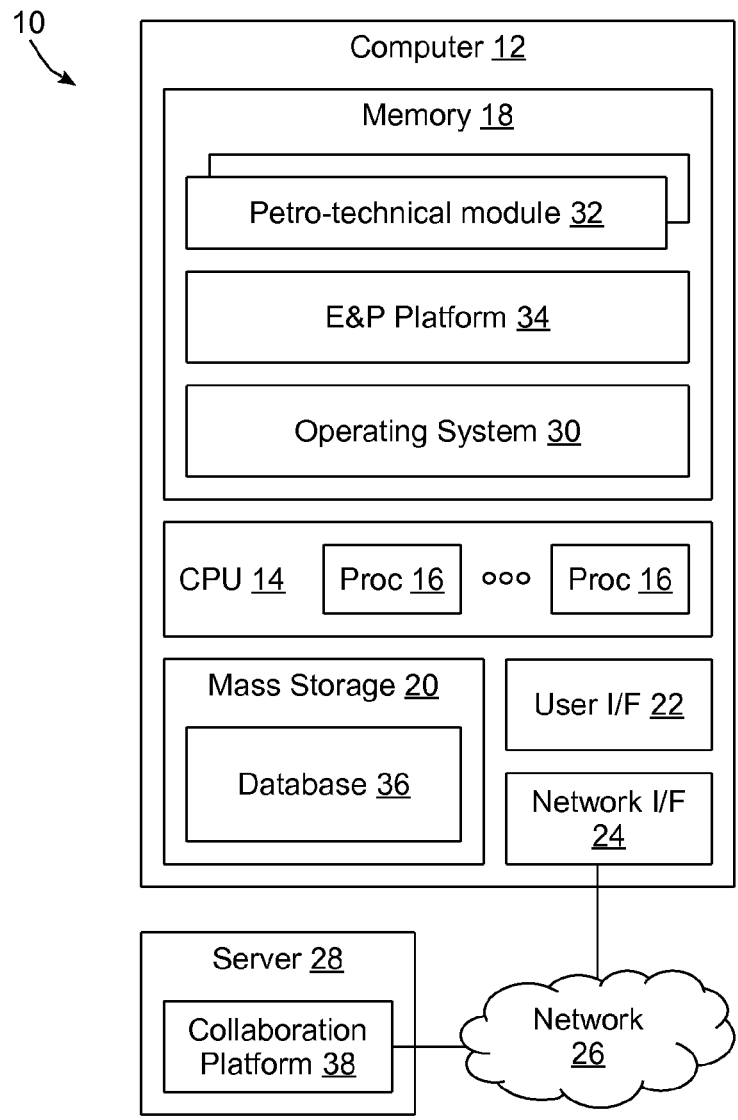
FIG. 1 is a block diagram of an example hardware and software environment for a data processing system in accordance with implementation of various technologies and techniques described herein.

Embodiments consistent with the invention simulate coupled reservoir and surface facilities within which various sectors of the reservoir may utilize models at varying resolutions in order to allow an engineer to efficiently model a region of interest in an oilfield asset. By including the network within an integrated asset model, back pressures imposed by the network and the capacity of the network may be taken into consideration when modeling asset performance, and by utilizing varying resolutions for different sectors of a reservoir or subsurface volume, an engineer has more flexibility in balancing accuracy and turnaround time when modeling the region of interest. As such, field development planning decisions, including, for example, locations of infill wells or re-injection wells may be made in an efficient manner.

The techniques disclosed herein may enable separate teams responsible for different areas of the reservoir to work substantially independently on different sectors of a reservoir or subsurface volume, while still including the influence of other parts of an integrated asset model (e.g., other reservoir sectors and the surface network) in the development of a field development plan (FDP). Doing so may also may promote consistency between separate modeling teams.

In the illustrated embodiments, for example, each sector of a reservoir or subsurface volume, once identified, may first be modeled at multiple levels of resolution of a reservoir description. The resolutions used may vary from very high resolution discretization of a reservoir (e.g., many small grid cells approaching seismic resolution), through progressively coarser models (fewer grid cells), to very coarse models of a few grid cells. Reservoir properties (e.g., porosity, permeability, etc.) may be averaged or upscaled onto the coarser grid cells during the process. It will be appreciated by one of ordinary skill in the art having the benefit of the instant disclosure that selection of model resolution generally reflects a tradeoff between the generally greater accuracy of predictive simulation at higher model resolutions and the generally faster speed of simulation (and shorter turnaround time) at lower model resolution.

Sector models at various resolutions may be considered to form a collection of sector models, and in some embodiments may be stored within a shared database for access across teams contributing to an overall field development plan. With a collection of sectors at multiple resolutions available, an engineer may select those sectors and resolutions that are appropriate to the engineer's particular task and piece them together to construct a "working" model of the integrated asset. In the illustrated embodiments, through construction of each sector, each possible working model may be configured to preserve appropriate reservoir volumetrics and well locations, promoting consistent predictive modeling. In addition, as part of the reconstruction, the properties across the interfaces of adjoining sectors, e.g., transmissibility (conductivity of the interfacial surface to fluid flow), may be calculated using techniques such as those defined in the Transmissibilty Calculations Chapter of the ECLIPSE Technical Description, available from Schlumberger, Ltd. and its affiliates, which is incorporated herein by reference to the extent not inconsistent with the present disclosure.

Each fully assembled "working" integrated asset model may therefore include several coupled sector models and a surface network model. If higher resolution of a reservoir sector is desired (e.g., for increased accuracy of simulation) or if it is desirable to sacrifice some resolution (e.g., to enable a faster turnaround of decision making) then sector models may be swapped in and out of the "working" model from the shared database of underlying models. In addition, in some embodiments, model updates to the underlying reservoir model based on comparing simulated results from the working models with observed reservoir production data may also be captured and propagated to the suite of underlying sector models in the database.

As such, the herein-described embodiments provide a method, apparatus, and program product that assist oilfield development planning using coupled simulation models of a subsurface reservoir and a surface pipeline network, and where the simulation models of the subsurface reservoir are partitioned into sectors of varying resolution. The approach promotes rapid field development planning and decision making by enabling engineers to consistently work on both an overall asset and specific sectors of the asset. Moreover, an engineer may chose to model the components of the system as full fidelity numerical simulations, simplified volume balance models or even with analytic functions to appropriately balance simulation speed and accuracy.

Further, embodiments of the disclosure may provide a system in which reservoir sector models at multiple resolutions may be consistently studied in the context of the full field model within a framework, thereby promoting consistent modeling of fluid flow within a surface pipeline network. The multiple levels of resolution may enable more rapid simulation of an asset and hence more rapid development of consistent asset field development plans.

Other advantages, variations and modifications will be apparent to one of ordinary skill in the art.

Hardware and Software Environment

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, one or more petro-technical modules or components 32 executing within an exploration and production (E&P) platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, E&P platform 34 may implemented as the PETREL Exploration & Production (E&P) software platform, while collaboration platform 38 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

Figure 2A:
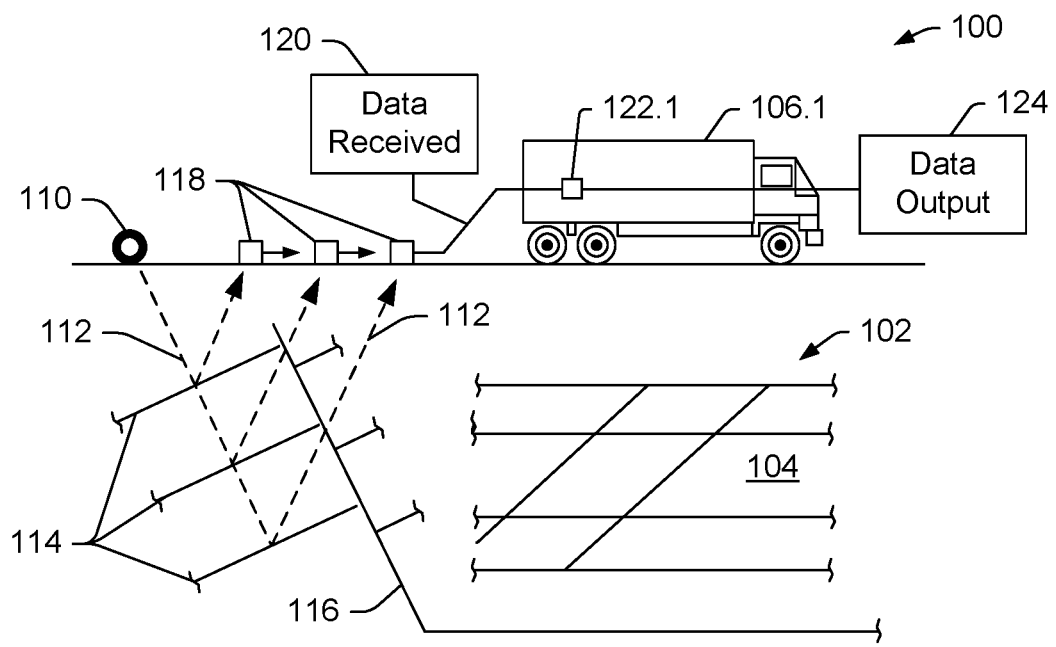
FIGS. 2A-2D illustrate simplified, schematic views of an oilfield having subterranean formations containing reservoirs therein in accordance with implementations of various technologies and techniques described herein.

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 2B:
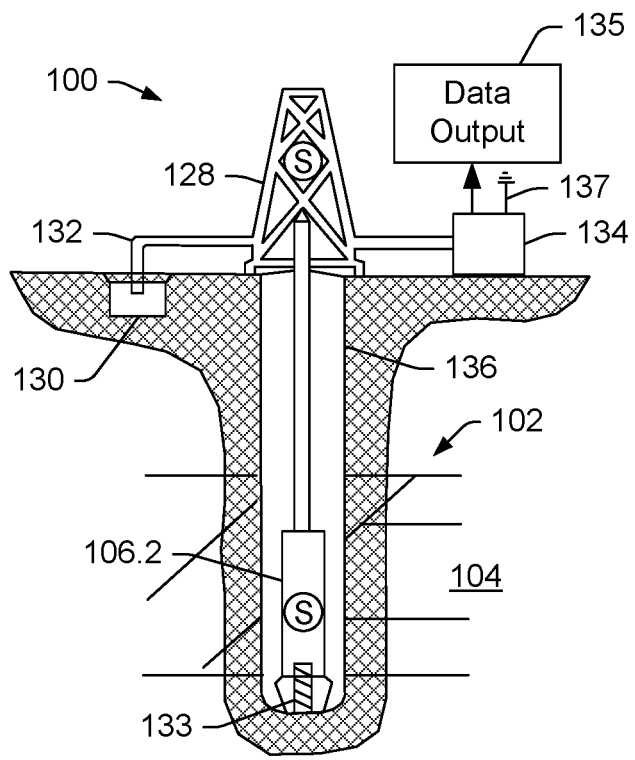

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 2C:
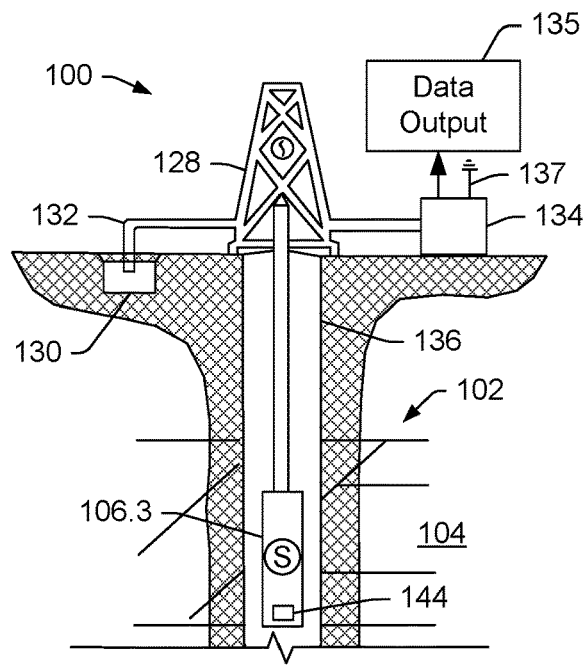

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 2D:
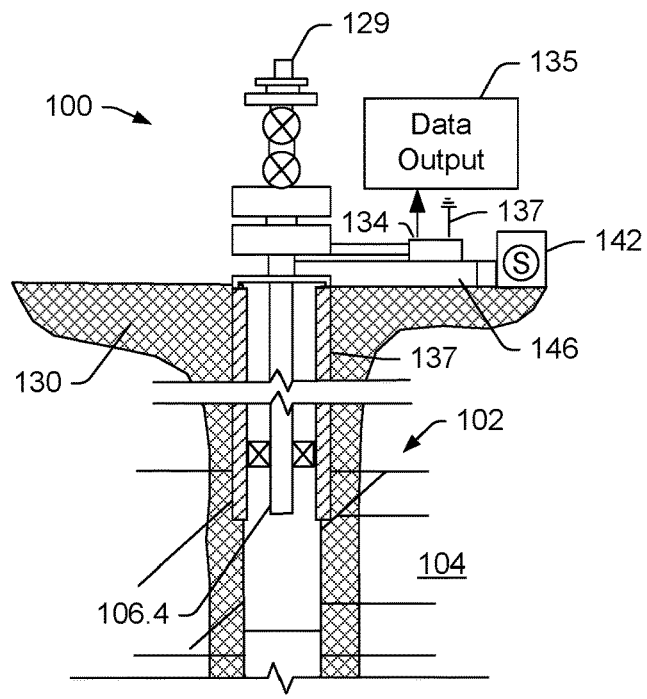

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
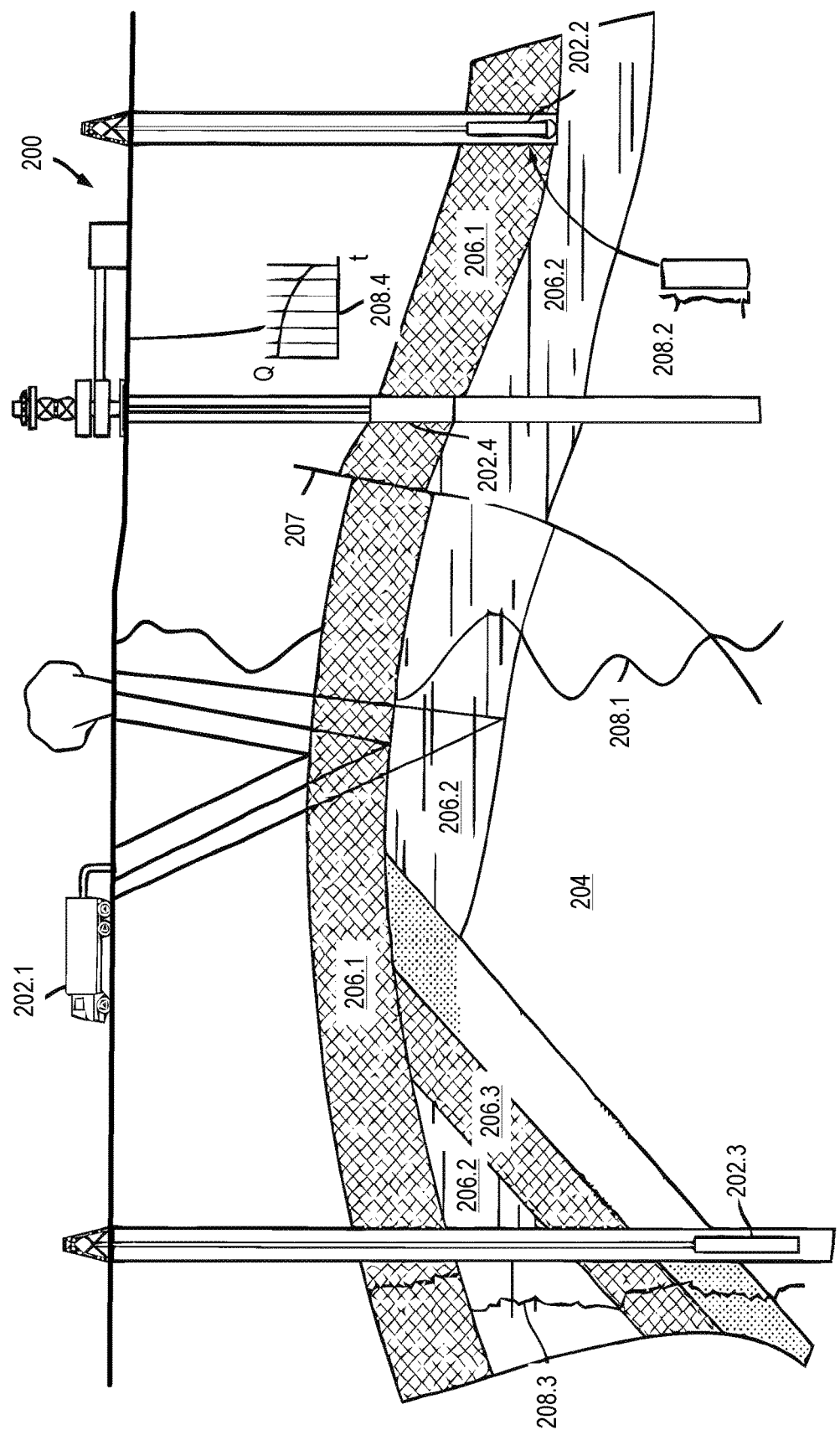
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
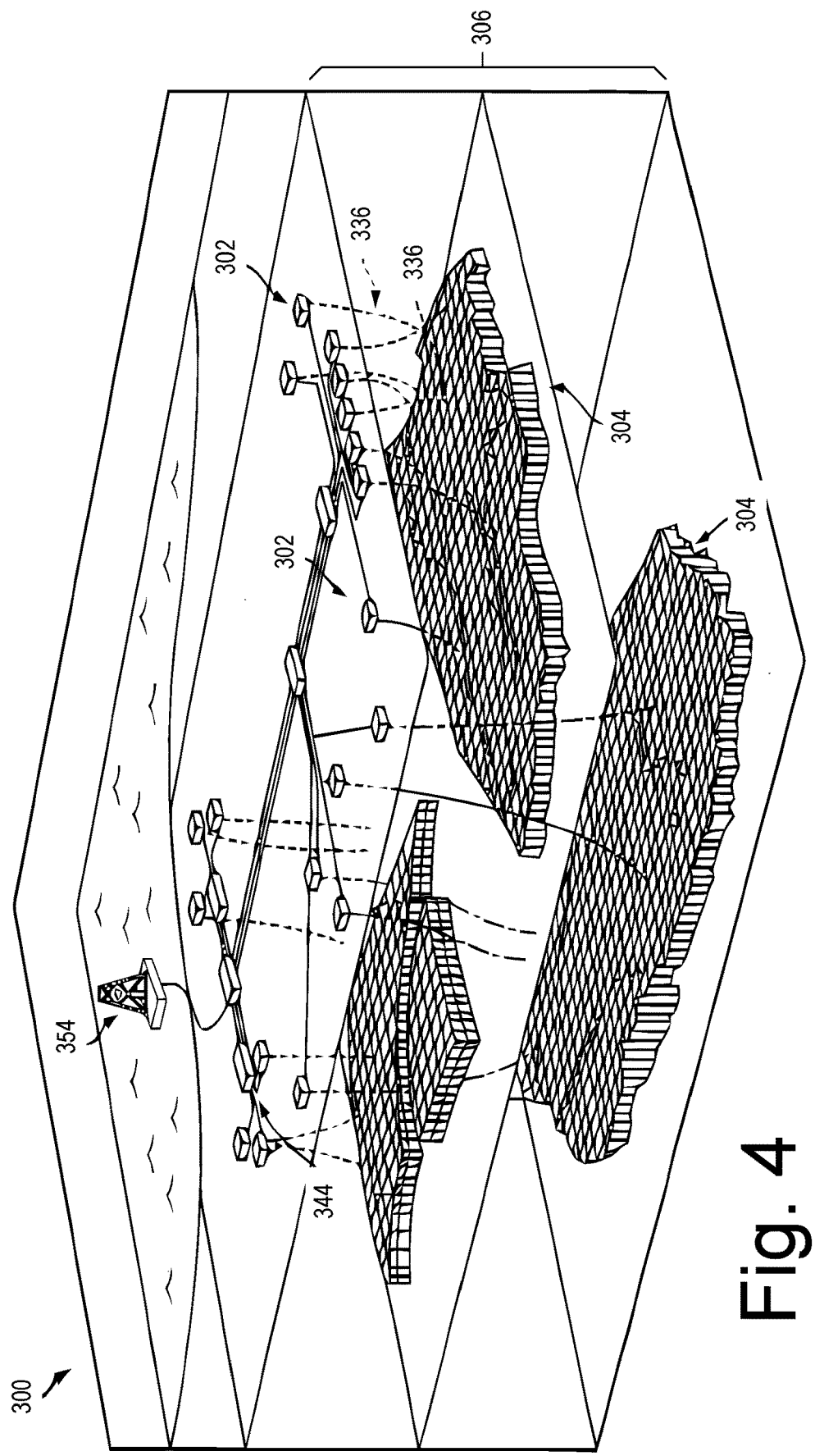
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 5:
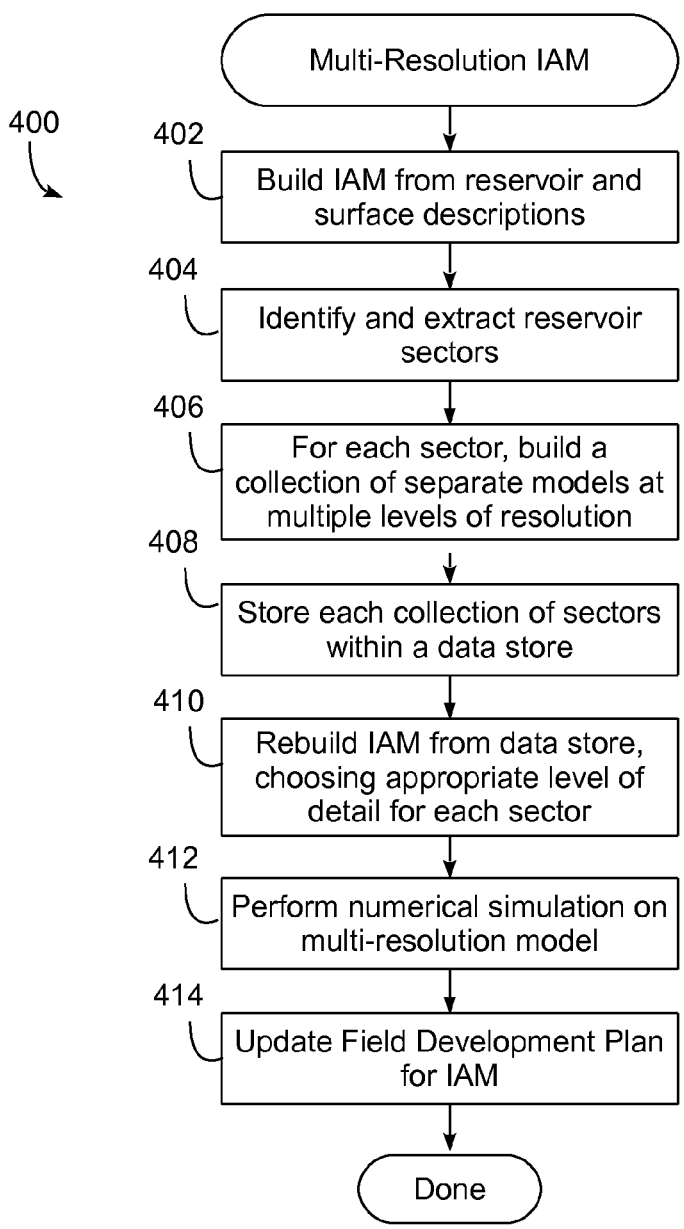
FIG. 5 is a flowchart of an example sequence of operations for of a method for generating a multi-resolution integrated asset model in accordance with implementations of various technologies and techniques described herein.

Integrated Oilfield Asset Modeling Using Multiple Resolutions Of Reservoir Detail FIG. 5 illustrates one example multi-resolution integrated asset modeling workflow 400 consistent with the invention. Workflow 400 may be implemented within one or more computers, e.g., from computer system 10 of FIG. 1, and may utilize one or more petro-technical components or modules 32 including custom program code and/or commercial petro-technical applications such as various commercially-available surface network simulators and/or reservoir simulators. As will be appreciated from the discussion herein, workflow 400 provides, among other benefits, an ability to balance the desire for fast turnaround and simulation performance with the accuracy and precision of simulation results, thereby enabling in some instances improved numerical simulation performance in a computer system with appropriate consideration for accuracy and precision of simulation results. Furthermore, workflow 400 may provide a technical improvement in the area of petroleum engineering and reservoir modeling.

Figure 6A:
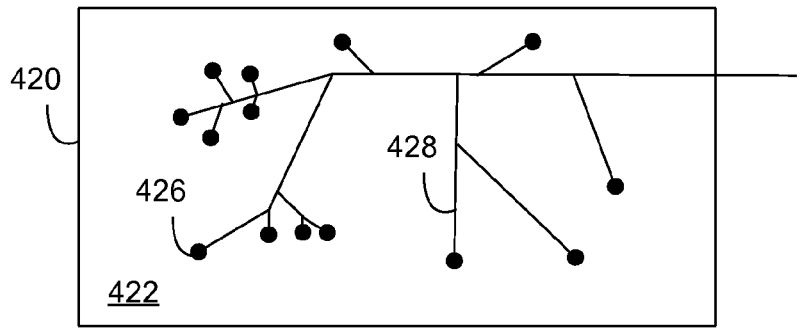
FIGS. 6A and 6B illustrate an example oilfield asset including a surface pipeline system gathering production from multiple wells penetrating a simplified subsurface reservoir.
Figure 6B:
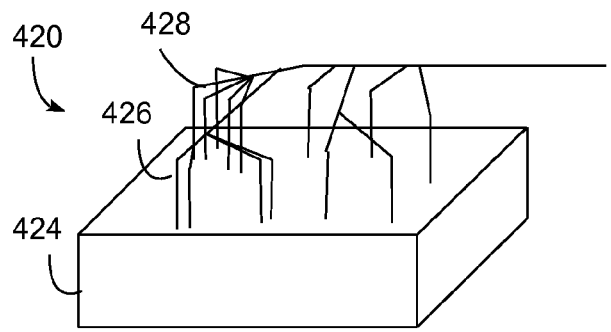

Workflow 400 begins in block 402 by building an initial Integrated Asset Model (IAM) of an asset (i.e., a geographical region of interest) based upon reservoir and surface descriptions, including the underlying model(s) of one or more contributing reservoir(s), existing and/or proposed well descriptions (e.g., locations, trajectories and/or design parameters) and descriptions of the overlying surface gathering production and injection network(s). With reference to FIGS. 6A and 6B, an example asset 420 representing a geographical region of interest 422 is illustrated, including a reservoir 424 and a plurality of existing wells 426 coupled to one another through a surface network 428. As such, the initial integrated asset model generally defines at least one reservoir model, a plurality of wells and a surface network coupled to the plurality of wells.

Figure 7:
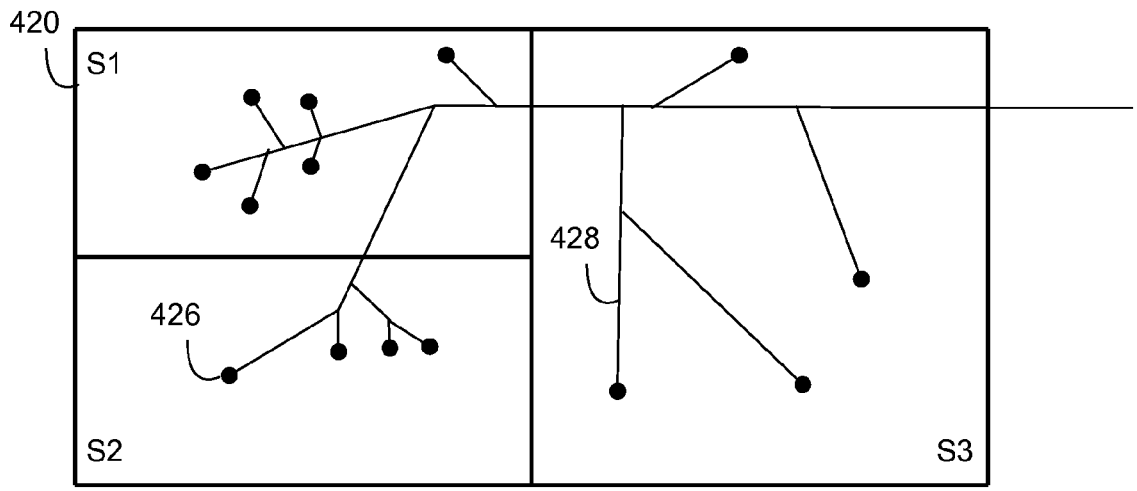
FIG. 7 illustrates division of the example oilfield asset of FIGS. 6A and 6B into sectors.

Returning to FIG. 5, once the IAM is built, the asset is divided into a plurality of contributing sectors or regions of interest in block 404. For example, as illustrated in FIG. 7, asset 420 may be divided into three sectors labeled S1, S2 and S3. A sector may, for example, include all the wells contributing to a certain production platform. It will be appreciated that the interaction between wells generally decreases with distance and, therefore, in some instances in the operational management of large reservoirs, sectors having clusters of wells, producing or injecting into regions of the reservoir, may be created. The placement of the sector boundaries may be determined in a number of manners, e.g., by using the physical extents of lease blocks, the locations of faults in the reservoir, by considering the drainage zones of the wells through numerical simulations, etc.

Returning again to FIG. 5, after dividing the asset into sectors, sector models may be extracted from the Integrated Asset Model in block 406 and discretized (gridded) at various levels of resolution to form a collection of models for each sector. In some embodiments, for example, the collection of models may be implicitly defined as mathematical transformations of a single fine scale model, while in other embodiments, the collection of models may be explicitly constructed as gridded models. Varying resolution models may be generated in some embodiments by considering varying resolution grids, as described above, or in some embodiments by using locally refined grids around wells.

The underlying reservoir properties for coarser models may be averaged up accordingly using various standard upscaling techniques, and the resolutions used for different models in each collection may vary from very high resolution discretization of a reservoir (e.g., many small grid cells approaching seismic resolution), through progressively coarser models (fewer grid cells), to very coarse models of a few grid cells, with reservoir properties (e.g., porosity, permeability, etc.) averaged or upscaled onto the coarser grid cells during the process. As such, at least a portion of the sector models may be generated by upscaling the initial Integrated Asset Model.

Figure 8:
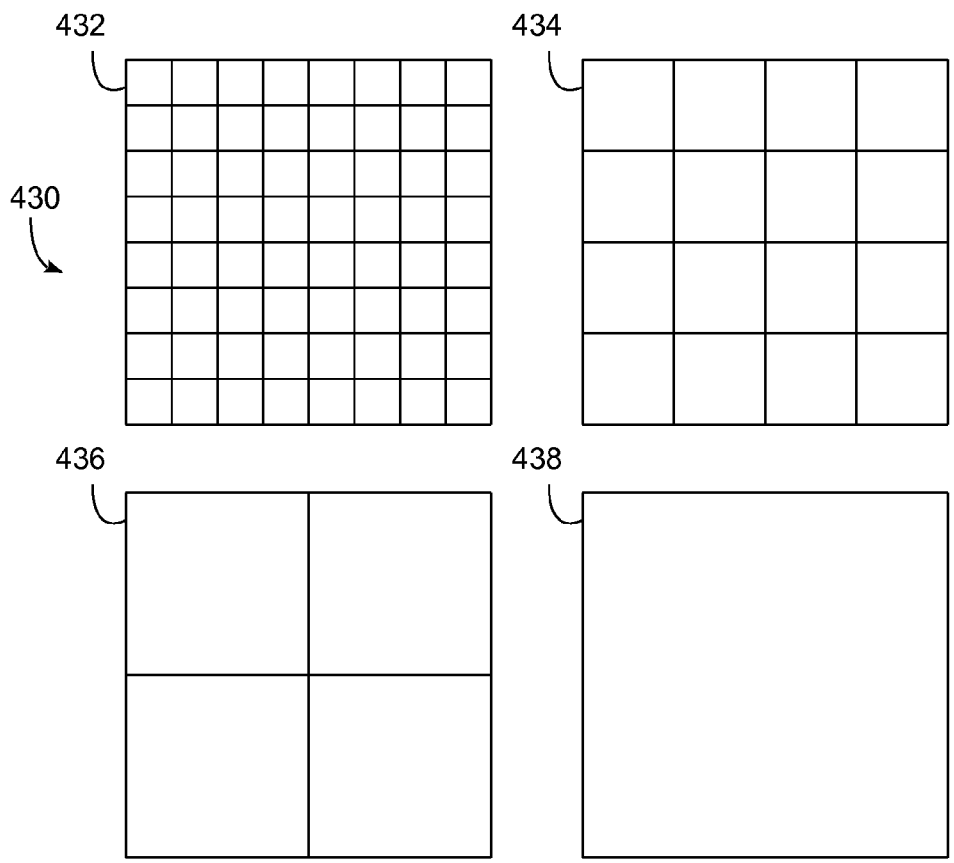
FIG. 8 illustrates an example collection of sector models at multiple levels of resolution.

For example, FIG. 8 illustrates an example collection 430 of four models 432, 434, 436, 438, with model 432 representing a high resolution model, and with models 434, 436, and 438 representing progressively coarser models, each having one quarter of the resolution of the preceding model. In this example collection, the properties of each cell in each of the coarser models may be represented by an average of the corresponding property of each of the four corresponding cells in the preceding, finer model in the collection.

Returning to FIG. 5, the collections of multiple resolution models of the various sectors are next stored in a data store in block 408 for later retrieval. In one embodiment, the collections may be stored in a database that provisions common access for all engineers working on the asset and a version management system to enable controlled updates to the models during the lifetime of the asset.

Next, as illustrated in block 410, using the stored collections of models for the sectors of the asset, the Integrated Asset Model may be rebuilt as a "working" or multi-resolution model by choosing, e.g., based upon user input, appropriate sector resolutions for each sector, based upon the goals and/or constraints of the particular project. For example, the appropriate level of detail for a very detailed study may rely upon high resolution models for all sectors. In another study that focuses on one particular sector or region of interest, however, lower resolution models may be chosen for sectors or regions that are not under current investigation. Each "working" model may utilize consistent well locations and a consistent surface network model from the original Integrated Asset Model, and users may be alerted in some embodiments if component parts of particular sector models have candidate changes from an overall field development plan, and users may be permitted to validate proposed changes and integrate them to create updated models.

In some embodiments, for example, all models (sectors and network) may be based on a consistent description of the Integrated Asset Model. The relationships between the models may be known and recorded in the data store, so if any component parts of the Integrated Asset Model are updated (e.g., where a well description has changed, a new fluid model has been added, a different property model is created based on new seismic data, etc.), inconsistency between related models may be detected, and automated or remedial action may be taken to regenerate any related sector models to take the updates into account.

In addition, in some embodiments, multiple versions of component parts may be maintained, thereby allowing engineers (working on the asset) to introduce changes to the components without impacting existing models (e.g., to try something out). For any working model, the versions of the components parts may be stored, thereby allowing working models to be automatically or manually updated (i.e., rebuilt) to incorporate any new/changed data. In some embodiments, based at least in part on the fact that the working model is implemented as a collection of related models (e.g., sector grids, wells, properties, etc.), the various related models may be manipulated independently, thereby allowing multiple instances of a working model to be maintained with different versions of the various related models. As such, functionality such as propagation of updates, branching, rolling-back, etc. may be supported.

Furthermore, in some embodiments, new and/or changed data may be accepted for rejected based upon validation. If accepted, data may be marked as a default (preferred) version to use, and any model not using that version of the data may be flagged to notify a user of the potential need to rebuild the model.

Figure 9:
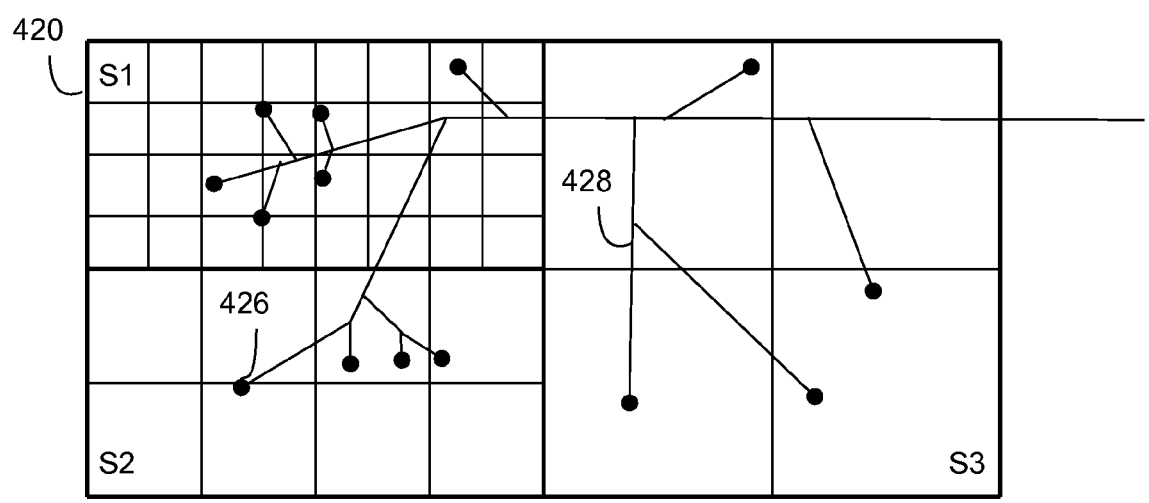
FIG. 9 illustrates a selection of sector models at varying resolutions for the example oilfield asset of FIGS. 6A and 6B.

FIG. 9, for example, illustrates asset 420 with different resolution models chosen for each sector. In this example, the focus of the investigation or study is directed to sector S1, and accordingly, a fine resolution model is used. However, for sectors S2 and S3, which are progressively more distant from sector S1, progressively coarser resolution models are chosen.

Returning yet again to FIG. 5, once the working model is built, numerical simulation is then performed on the working multi-resolution model in block 412. For example, numerical flow simulations may be performed for the coupled reservoir and surface system using numerical reservoir simulators such as the ECLIPSE or INTERSECT reservoir simulators, numerical pipe flow simulators such as the PIPESIM pipe flow simulator and a model coupling component such as the AVOCET® IAM model coupling technology, all of which are available from Schlumberger Ltd. and its affiliates.

Such components may be used to simulate the asset performance through time under a pre-specified series of operational logic and constraints. Insights from the analysis of the simulations may then enable a petroleum engineering team to update a field development plan for how the asset will be operated, e.g., as illustrated in block 414. Updates may include changes to operational parameters (rates and pressures), changes to a recovery scheme (e.g. water flooding, chemical injection, etc.), or proposed new wells. Should new wells be proposed, the new wells may also be introduced to both the surface gathering network and to the suite of reservoir sector models into which the wells are to be placed, whereby further simulations may be performed thereafter.

It will be appreciated that with the sectors of the working model modeled at different resolutions, the overall asset still may be solved as a single system. Nonetheless, when reduced resolutions are used outside of a region of interest, numerical simulation generally may be performed with less runtime than would occur when running the simulation at a uniform high resolution in all sectors. Accordingly, improved performance and reduced turnaround time may be achieved from numerical simulation without the same reduction in accuracy and precision that would otherwise occur if the entire asset is simulated at a uniform lower resolution.

Figure 10:
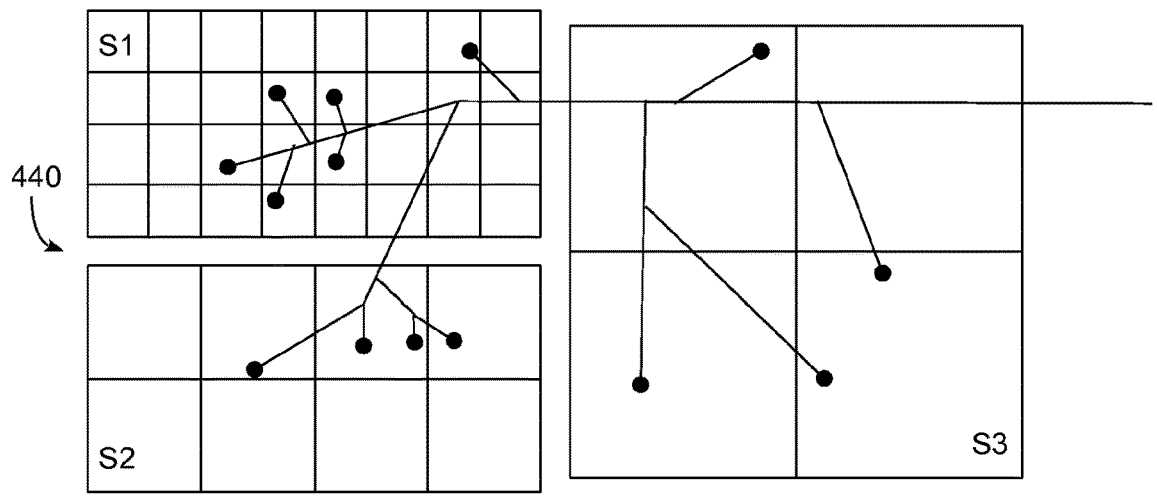
FIG. 10 illustrates an example embodiment of an integrated asset model for the example oilfield asset of FIGS. 6A and 6B in which independent models of varying resolution are used for each of the sectors.

FIG. 10 illustrates another embodiment of an integrated asset model 440, in which the sectors S1, S2 and S3 may be considered sufficiently independent that they may be solved independently and coupled only via a surface network model. Modeling the sectors independently may provide a greater potential for performance improvements in such embodiments, since solving the sectors may generally be considered to be a parallel task. Using such an approach, for example, may enable very low resolution well proxies such as material balance models or analytic function to be considered, or may enable sectors to be replaced by replaying responses generated and stored in a previous full-field simulation.

Furthermore, when using a numerical reservoir simulation to model sectors independently, a number of techniques may be used to treat the artificial boundary around each sector. Such techniques include using a no-flow boundary condition, using fluxes computed on a prior full field simulation, using pressures computed on a prior full field simulation, etc. Such approaches may introduce inaccuracies into a simulation in some instances, e.g., if a user is not aware of the associated assumptions and limitations. Thus, it may be desirable in some instances to later validate the work by running a full field simulation thereafter.

Figure 11:
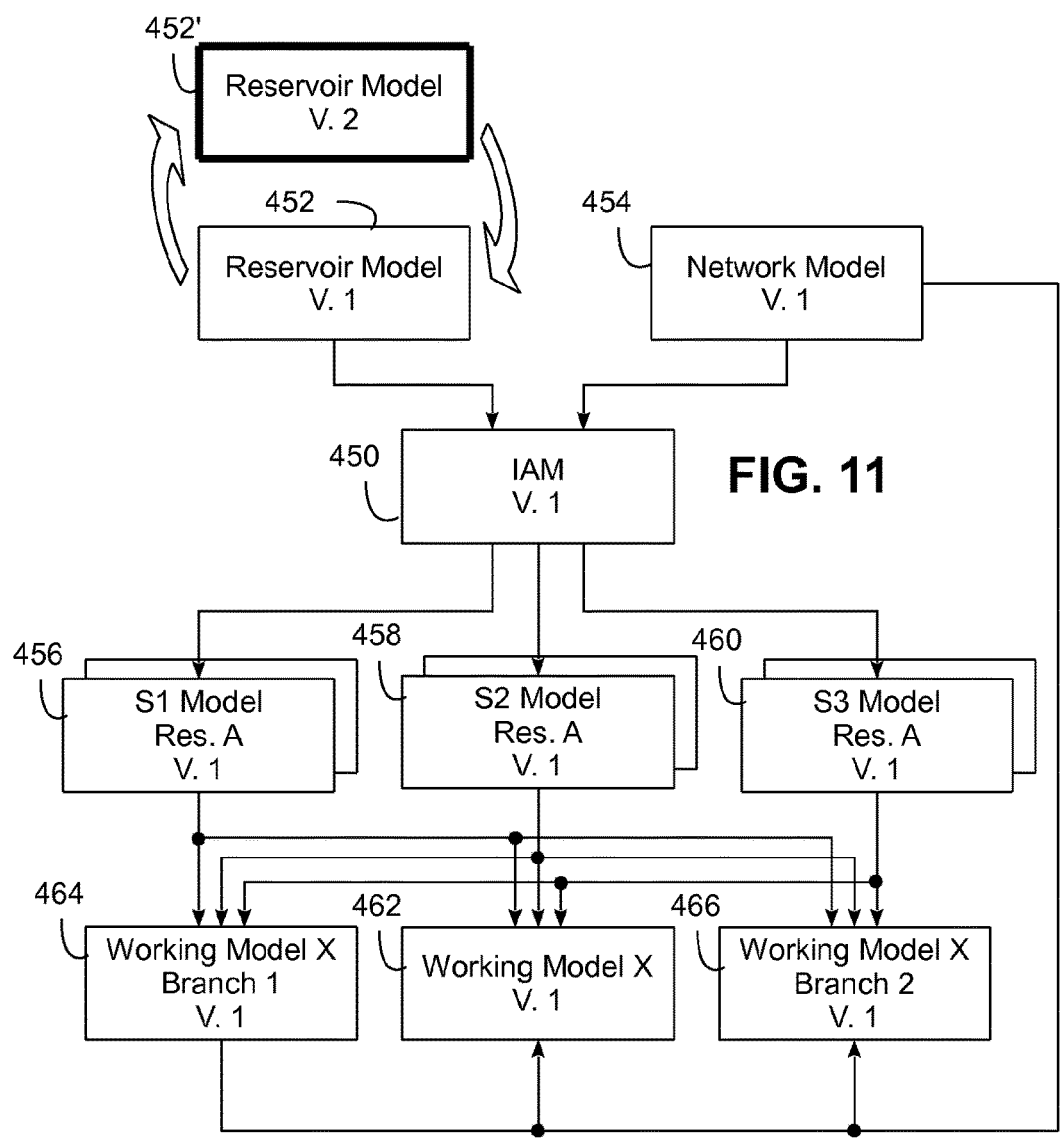
FIG. 11 illustrates a block diagram of various components of an integrated asset model and various multi-resolution models generated therefrom.

Now turning to FIG. 11, as discussed above, multiple versions of component parts of an integrated asset model may be maintained, thereby allowing engineers (working on a given asset) to introduce changes to the components without impacting existing models (e.g., to try something out). Moreover, multiple working models may be created based upon an integrated asset model, and such versioning may be applied to the working models as well. Thus, as illustrated in FIG. 11, an integrated asset model 450 may be based on a reservoir model 452 and a network model 454, both of which are illustrated as version 1 models. Considering again a partitioning of an asset into three sectors S1-S3, in the generation of working models, collections of sector models at varying resolutions may be generated for sectors S1-S3, as illustrated at 456, 458 and 460, and a working model 462 may be generated to incorporate various models from each of collections 456, 458, and 460 (as well as network model 454).

Of note, each of these components and models may be assigned a version identifier (e.g., version 1 as illustrated in FIG. 11). Upon the introduction of a new reservoir model or other component, however (e.g., reservoir model 452', designated as version 2), a notification may be made as to the update to the reservoir model, and the changes to the reservoir model may be propagated to other components, e.g., integrated asset model 450, collections 456-460 and/or working model 462, e.g., by regenerating the models/components using the new version of the reservoir model. The regenerated models/components may be assigned new version numbers (not shown in FIG. 11), and moreover, the prior versions of the models/components may be maintained if desired, e.g., to enable a roll-back to be performed to a prior version.

In addition, as illustrated by working models 464 and 466, multiple working models may be generated from a given integrated asset model, and in some instances, these other working models may be treated as "branches" of the initial working model 462 to enable, for example, other engineers or teams to perform different tasks associated with the asset, or to enable different changes to be tested or tried out without affecting the main working model.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method comprising:
building an initial integrated asset model of an oilfield asset of an oilfield;
dividing the initial integrated asset model into different sectors, wherein each of the sectors models a subsurface portion of the oilfield and wells coupled to a surface pipeline network;
for each of the different sectors, generating, and storing to a data store, a collection of sector models modeled at different spatial resolutions according to a mathematical progression, wherein each of the different spatial resolutions corresponds to a number of grid cells for the subsurface portion of the oilfield, wherein the number of grid cells differs for each of the different spatial resolutions, and wherein spatial resolution, simulation accuracy for simulation results and turnaround time for simulation results increase with respect to an increase in the number of grid cells;
based on a balance between accuracy and turnaround time for simulation results for a region of interest in the oilfield, for each of the different sectors, selecting and accessing from the data store one of the sector models from the collection of sector models, wherein a number of grid cells of the initial integrated asset model for one of the different sectors is greater than a number of grid cells for a corresponding one of the selected and accessed sector models, and wherein the one of the selected and accessed sector models comprises an upscaled reservoir property from upscaling the reservoir property from the initial integrated asset model or an intermediate sector model to the one of the selected and accessed sector models by averaging values of the reservoir property from a plurality of the grid cells in the initial integrated asset model or the intermediate sector model to determine a value of the reservoir property for a corresponding one of the grid cells in the one of the selected and accessed sector models;

building a multi-spatial resolution integrated asset model of the oilfield asset using the selected sector model for each of the different sectors, the multi-spatial resolution integrated asset model further including a surface network model of the surface pipeline network;

performing a simulation using the multi-spatial resolution integrated asset model to generate the simulation results for the region of interest, wherein the simulation results are for fluid flow; and updating a field development plan for the oilfield based upon the simulation results.

2. The method of claim 1, wherein selecting and accessing one of the sector models is performed in response to user input via a computerized interface.

3. The method of claim 1, wherein building the initial integrated asset model is based upon reservoir and surface descriptions of the oilfield asset, and wherein the initial integrated asset model defines at least one reservoir model.

4. The method of claim 1, wherein dividing the initial integrated asset model into different sectors is based at least in part on well contributions to production platforms, physical extents of lease blocks, fault locations in a reservoir or locations of well drainage zones.

5. The method of claim 1, wherein the data store includes a database and a version management system to control updates to the sector models stored in the database, and further comprising propagating a model update to the initial integrated asset model to at least one of the sector models stored in the database.

6. The method of claim 1, wherein performing the simulation comprises performing numerical simulation using a numerical reservoir simulator, a numerical pipe flow simulator and a model coupling component.

7. The method of claim 1, wherein performing the simulation comprises solving the selected and accessed sector models independently.

8. The method of claim 1 comprising selecting another region of interest and selecting and accessing at least one of the sector models modeled at a different spatial resolution.

9. The method of claim 1 comprising controlling at least one piece of equipment in the oilfield based on updating the field development plan.

10. The method of claim 9 wherein controlling comprises controlling drilling in the oilfield.

11. The method of claim 1 wherein updating the field development plan comprises updating a well plan for a well.

12. The method of claim 1 wherein the reservoir property is porosity.

13. The method of claim 1 wherein the reservoir property is permeability.

14. The method of claim 1 comprising receiving an update to the initial integrated asset model and automatically updating at least one of the collections of sector models.

15. The method of claim 14 wherein the update comprises an update to a well description.

16. The method of claim 14 wherein the update comprises an update to a property model based on seismic data.

17. The method of claim 1 wherein the one of the selected and accessed sector models comprises a plurality of upscaled reservoir properties.

18. The method of claim 1 wherein the mathematical progression is a geometric progression.

19. A system, comprising:
at least one processing unit; and
program code configured upon execution by the at least one processing unit to:
  build an initial integrated asset model of an oilfield asset of an oilfield;
  divide the initial integrated asset model into different sectors, wherein each of the sectors models a subsurface portion of the oilfield and wells coupled to a surface pipeline network;
  for each of the different sectors, generate, and store to a data store, a collection of sector models modeled at different spatial resolutions according to a mathematical progression, wherein each of the different spatial resolutions corresponds to a number of grid cells for the subsurface portion of the oilfield, wherein the number of grid cells differs for each of the different spatial resolutions, and wherein spatial resolution, simulation accuracy for simulation results and turnaround time for simulation results increase with respect to an increase in the number of grid cells;
  based on a balance between accuracy and turnaround time for simulation results for a region of interest in the oilfield, for each of the different sectors, select and access from the data store one of the sector models from the collection of sector models, wherein a number of grid cells of the initial integrated asset model for one of the different sectors is greater than a number of grid cells for a corresponding one of the selected and accessed sector models, and wherein the one of the selected and accessed sector models comprises an upscaled reservoir property from upscaling the reservoir property from the initial integrated asset model or an intermediate sector model to the one of the selected and accessed sector models by averaging values of the reservoir property from a plurality of the grid cells in the initial integrated asset model or the intermediate sector model to determine a value of the reservoir property for a corresponding one of the grid cells in the one of the selected and accessed sector models;
  build a multi-spatial resolution integrated asset model of the oilfield asset using the selected sector model for each of the different sectors, the multi-spatial resolution integrated asset model further including a surface network model of the surface pipeline network;
  perform a simulation using the multi-spatial resolution integrated asset model to generate the simulation results for the region of interest, wherein the simulation results are for fluid flow; and
  update a field development plan for the oilfield based upon the simulation results.

20. A program product, comprising:
a non-transitory computer readable medium; and
program code stored on the computer readable medium and configured upon execution by at least one processing unit to:
  build an initial integrated asset model of an oilfield asset of an oilfield;

divide the initial integrated asset model into different sectors, wherein each of the sectors models a subsurface portion of the oilfield and wells coupled to a surface pipeline network;

for each of the different sectors, generate, and store to a data store, a collection of sector models modeled at different spatial resolutions according to a mathematical progression, wherein each of the different spatial resolutions corresponds to a number of grid cells for the subsurface portion of the oilfield, wherein the number of grid cells differs for each of the different spatial resolutions, and wherein spatial resolution, simulation accuracy for simulation results and turnaround time for simulation results increase with respect to an increase in the number of grid cells;

based on a balance between accuracy and turnaround time for simulation results for a region of interest in the oilfield, for each of the different sectors, select and access from the data store one of the sector models from the collection of sector models, wherein a number of grid cells of the initial integrated asset model for one of the different sectors is greater than a number of grid cells for a corresponding one of the selected and accessed sector models, and wherein the one of the selected and accessed sector models comprises an upscaled reservoir property from upscaling the reservoir property from the initial integrated asset model or an intermediate sector model to the one of the selected and accessed sector models by averaging values of the reservoir property from a plurality of the grid cells in the initial integrated asset model or the intermediate sector model to determine a value of the reservoir property for a corresponding one of the grid cells in the one of the selected and accessed sector models;

build a multi-spatial resolution integrated asset model of the oilfield asset using the selected sector model for each of the different sectors, the multi-spatial resolution integrated asset model further including a surface network model of the surface pipeline network;

perform a simulation using the multi-spatial resolution integrated asset model to generate the simulation results for the region of interest, wherein the simulation results are for fluid flow; and update a field development plan for the oilfield based upon the simulation results.

* * * * *